(12) United States Patent
Staufer et al.

(10) Patent No.: US 6,844,521 B2
(45) Date of Patent: Jan. 18, 2005

(54) DEVICE FOR A LASER-HYBRID WELDING PROCESS

(75) Inventors: Herbert Staufer, Enns (AT); Manfred Rührnössl, Linz (AT); Gerhard Miesbacher, Weisskirchen (AT); Manfred Hubinger, Kremsmünster (AT); Wolfgang Haberler, Vorchdorf (AT); Ewald Berger, Wels (AT)

(73) Assignee: Fronius International GmbH, Pettenbach (AT)

( * ) Notice: Subject to any disclaimer, the term of this patent is extended or adjusted under 35 U.S.C. 154(b) by 0 days.

(21) Appl. No.: 10/415,857

(22) PCT Filed: May 18, 2001

(86) PCT No.: PCT/AT01/00157
§ 371 (c)(1),
(2), (4) Date: May 2, 2003

(87) PCT Pub. No.: WO02/40211
PCT Pub. Date: May 23, 2002

(65) Prior Publication Data
US 2004/0026388 A1 Feb. 12, 2004

(30) Foreign Application Priority Data
Nov. 16, 2000 (AT) ........................................ A 1936/2000

(51) Int. Cl.[7] .......................... B23K 29/20; B23K 9/167
(52) U.S. Cl. ................ 219/121.63; 219/74; 219/121.78; 219/137.2
(58) Field of Search ..................... 219/121.78, 121.63, 219/121.84, 74, 137.2; 359/509

(56) References Cited

U.S. PATENT DOCUMENTS

| 5,258,599 | A | * | 11/1993 | Moerke ................. 219/121.48 |
| 5,814,786 | A | | 9/1998 | Johnson et al. |
| 5,981,901 | A | | 11/1999 | La Rocca |
| 6,034,343 | A | * | 3/2000 | Hashimoto et al. ........... 219/74 |

FOREIGN PATENT DOCUMENTS

| DE | 196 27 803 | | 10/1997 |
| DE | 10017845 | C1 * | 1/2002 |
| EP | 0 618 037 | | 10/1994 |
| JP | 54-54932 | A * | 5/1979 |
| JP | 1-107994 | A * | 4/1989 |
| JP | 5-69165 | A * | 3/1993 |
| WO | WO00/24543 | | 5/2000 |
| WO | WO-00-24543 | A1 * | 5/2000 |
| WO | WO-01-38038 | A2 * | 5/2001 |

* cited by examiner

Primary Examiner—Geoffrey S. Evans
(74) Attorney, Agent, or Firm—Collard & Roe, P.C.

(57) ABSTRACT

The invention describes an apparatus, in particular a laser hybrid welding head (1) for a laser hybrid welding process, in which a laser (4) or laser optics or an optical focussing unit and elements of a welding torch (5) for an arc welding process and/or a feed device for a welding wire as well as a device for generating a cross jet (8) connected by at least an incoming line (9) and an outgoing line (10) to a compressed air supply system, are mounted on at least one mounting element (2). The incoming line (9) and the outgoing line (10) carrying compressed air for the cross jet (8) are disposed between the two components, in particular the laser (4) and laser optics or the optical focussing unit and the elements of the welding torch (5) or feed device for the welding wire (21).

29 Claims, 6 Drawing Sheets

DEVICE FOR A LASER-HYBRID WELDING PROCESS

CROSS REFERENCE TO RELATED APPLICATIONS

Applicants claim priority under 35 U.S.C. §119 of Austrian Application No. A 1936/2000 filed Nov. 16, 2000. Applicants also claim priority under 35 U.S.C. §365 of PCT/AT01/00157 filed May 18, 2001. The international application under PCT article 21(2) was not published in English.

BACKGROUND OF THE INVENTION

1. Field of the Invention

The invention relates to an apparatus, in particular a laser hybrid welding head, for a laser hybrid welding process, as well as a cross jet guide device for a laser hybrid welding process, of the type defined in claims 1 and 14.

2. Description of the Prior Art

Apparatus is already known, in particular laser hybrid welding heads, for a laser hybrid welding process, in which a laser and laser optics or an optical focussing unit and a welding torch are disposed on a mounting plate. A cross jet guide device co-operates with the laser and the optical focussing unit in order to form a cross jet, the cross jet guide device being connected to a compressed air supply system by an incoming line and an outgoing line. As a result of the so-called cross jet, the optical system of the laser or the laser optics or the optical focussing unit are shielded from any weld splatter generated during welding processes. The incoming line and the outgoing line are provided on either side of the laser and the laser optics or the optical focussing unit. When using apparatus of this type during a welding process, the surface of the workpiece is heated by the premature laser and laser optics or the optical focussing unit or melting may be initiated below the surface of the workpiece due to focussing on the focal point or burning to a certain depth due to the laser beam, so that during the subsequent arc welding process the burned depth becomes even greater resulting in a welding bead due to the delivery of a welding wire or an additional material.

The disadvantage of this situation is that a considerable amount of space is needed to run the incoming and outgoing line on either side, which significantly increases the size of a laser hybrid welding head of this type.

Devices for generating a cross jet are also known, in which an outlet element and an inlet element for compressed air are provided on either side of the laser and laser optics or optical focussing unit, enabling a cross jet, in other words an air flow, to be generated between the outlet element and the inlet element to pick up any loose metal debris.

The disadvantage of this system is that the cross jet produced by this structure is necessarily large in terms of surface area, resulting in a very high vacuum pressure in the region of the cross jet, making it necessary to dispose the latter at a large distance from a welding process when operating with a shielding gas atmosphere to prevent it from being sucked away.

Documents U.S. Pat. No. 5,981,901 A, U.S. Pat. No. 5,814,786 A and EP 0 618 037 A describe methods and devices for laser welding, in which a cross jet guide device is used to protect against welding splatter. The cross jet guide device is provided in the form of an elongate housing and a compressed air supply system is disposed on one side of the housing to deliver compressed air to create a cross jet in the interior, which then leaves the housing from the oppositely lying side of the housing. The housing also has an end-to-end orifice for a laser beam, which extends through the orifice.

The disadvantage of this approach is that a cross jet guide device of this design requires a large amount of space and is of large structural dimensions because the incoming and outgoing lines for the compressed air are arranged on either side of the housing. Consequently, a cross jet guide device of this type can only be used for a pure laser welding process.

Patent specification WO 00/24543 A also discloses a laser hybrid welding head, the laser of which is disposed at the centre. On either side of the laser a respective welding torch is mounted by means of a common mounting rail and can be displaced by means of the mounting rail.

This disadvantage of this structure is that it does not permit the use of a cross jet guide device and the laser optics become soiled by welding debris after a short welding time, which sharply reduces the power of the laser.

SUMMARY OF THE INVENTION

The underlying objective of the invention is to propose an apparatus, in particular a laser hybrid welding head for a laser hybrid welding process, and a cross jet guide system, whereby the component size is compact and the structure of the laser hybrid welding head and the cross jet guide device is simple.

This objective is achieved by the invention due to the fact that the incoming line and the out-going line for the compressed air for the cross jet are disposed between two of the components, in particular the laser and the laser optics or the optical focussing unit, and the elements of the welding torch or the feed apparatus for the welding wire. The advantage obtained by the special design of the laser hybrid welding head is that there are no lines at all in the area around the individual components and no lines running into the region around the welding process because they are all connected to the components at the oppositely lying end. This avoids the laser hybrid welding head from being left hanging from an object because there are no lines standing out around the components. The fact that the laser hybrid welding head can be used in mirror image without changing the robot, in particular its programmed path, is a major advantage because the laser hybrid welding head is designed to be symmetrically attached to the robot, in particular to the manipulator of the robot arm, and there is no need to make allowance for any protruding lines or parts, whilst the special design of the laser hybrid welding head means that it can also be used for areas that are not readily accessible.

The objective of the invention is also achieved due to the fact that the housing of the cross jet guide device has an end-to-end orifice for a laser beam extending through the orifice, and an outlet passage and an oppositely lying inlet passage for the compressed air, in particular for the cross jet or the cross jet flow, is provided in the end faces of the orifice The advantage of this is that by using this type of cross jet with a cross jet guide device, a closed system is created inside the housing and the cross jet flow occurs within the orifice only so that there are no or only slight air flow outside of this orifice. This enables the distance left between the cross jet or cross jet guide device and the welding process, in particular the arc welding process, to be kept very short, significantly reducing the construction size of the laser hybrid welding head, which considerably improves handling of the laser hybrid welding head.

The objective is also achieved by the invention due to the fact that the torch or the welding torch is made up of several individual modules and at least one module, in particular the torch body, can be changed in order to run a whole range of different joining processes, in particular a welding process or a soldering process. The advantage of this is that the laser hybrid welding process can be adapted to operate a whole range of different joining process with little effort. Another major advantage resides in the fact that, because of the special design of the laser hybrid welding head, the process of changing the torch body in readiness for a different welding process can be automated.

BRIEF DESCRIPTION OF THE DRAWING

To provide a clearer understanding of the invention, it will now be described in more detail with reference to embodiments illustrated as examples in the appended drawings.

Of these.

DESCRIPTION OF THE PREFERRED EMBODIMENTS

Firstly, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc,. relate to the drawing specifically being described and can be transposed in terms of meaning to a new position when another position is being described. Individual features or combinations of features from the different embodiments illustrated and described may be construed as independent inventive solutions or solutions proposed by the invention in their own right.

FIGS. 1 to 5 illustrate an example of one embodiment of an apparatus, in particular a laser hybrid welding head 1, and a specially designed mounting element 2 for mounting the individual components of the laser hybrid welding head 1.

Standard, commercially available elements and units known from the prior art are employed and used in a special combination with one another in the laser hybrid welding head 1 proposed by the invention. Accordingly, a laser 4 and a laser optical system or an optical focussing unit and elements of a welding torch 5 for an arc welding process 6, schematically indicated, or a feed device for a welding wire or an electrode, as well as a cross jet guide device 7 for forming a cross jet 8, connected to a compressed air supply system—not illustrated—by at least one incoming line 9 and one outgoing line 10, are mounted on the mounting element 2, which is connected to a robot, in particular a robot arm 3, as schematically indicated.

Figure 1:
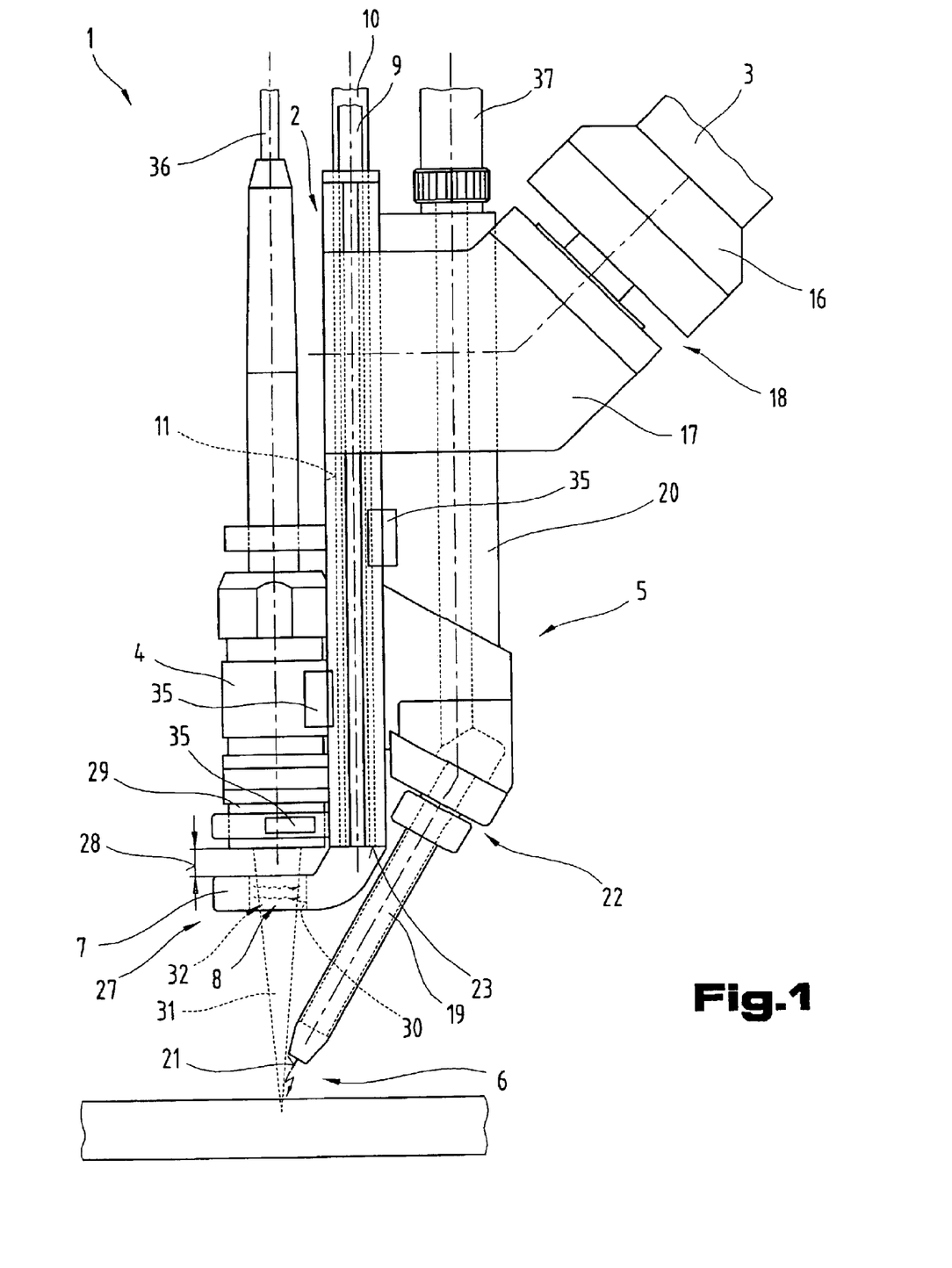
FIG. 1 is a simplified, schematic diagram showing a structure of the laser hybrid welding head proposed by the invention, seen from a side view.
Figure 2:
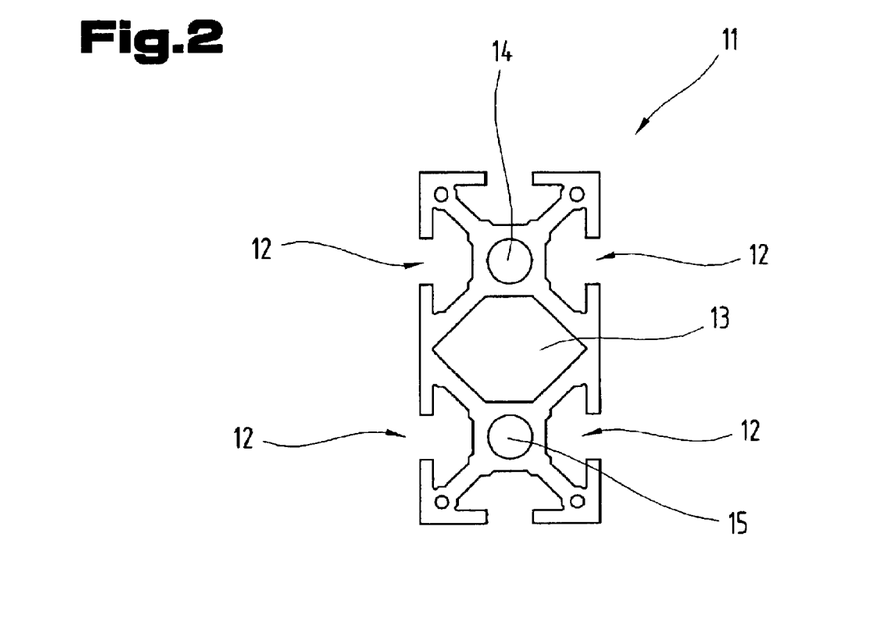
FIG. 2 is a simplified, schematic diagram showing an end-on view of a section used for the laser hybrid welding head.

In the laser hybrid welding head 1 proposed by the invention, the mounting element 2 has a section 11 corresponding to the diagram given in FIG. 2, with mounting grooves 12 for the components of the laser hybrid welding head 1. The section 11 is designed with an end-to-end passage 13 through the centre, which preferably constitutes or is connected to the outgoing line 10, and, parallel with this passage 13, two other passages 14, 15, which preferably constitute or are connected to the incoming lines 9. As a result, the incoming line 9 and the outgoing line 10 for the compressed air delivered for the cross jet 8 are disposed between the two components, in particular the laser 4 and the laser optics or the optical focussing unit and the elements of the welding torch 5, as schematically indicated, and, in the particular embodiment illustrated as an example in FIGS. 1 and 2, the incoming line 9 and the outgoing line 10 are integrated in the mounting element 2, in particular in the section 11, so that the compressed air for the cross jet 8 is delivered and discharged on one side of the cross jet guide device 7. In the embodiment described below and illustrated as an example in FIG. 6, however, the incoming line 9 and the outgoing line 10 are no longer integrated in the mounting element 2 or the section 11 but extend parallel with the section 11, so that, again, they are disposed between the two components, in particular the laser 4 and the welding torch 5. In this example—illustrated in FIG. 6—the section 11 also has no internally lying passages 13 to 15.

To enable the section 11 to be secured to a manipulator 16 of a robot, in particular a robot arm 3, in the most effective way possible, the section 11 is connected to the manipulator 16 of the robot by means of a fixing device 17, which may be seen in FIG. 1. This being the case, a contact-breaking device 18 is provided between the manipulator 16 of the robot, in particular the robot arm 3, and the section 11. This contact-breaking device 18 operates in such a way that when pressure is duly exerted on the laser hybrid welding head 1, as would be the case when the laser hybrid welding head is being run along an object, the laser hybrid welding head 1 can be deflected accordingly by means of this contact-breaking device 8, the only thing needed to activate the contact-breaking device 18 being the application of a defined force. The major advantage of a contact-breaking device 18 of this type resides in the fact that the laser hybrid welding head 1 is maintained in a defined spot or position and, when a defined force is applied to the laser hybrid welding head 1, the latter is moved by the contact-breaking device 18, and when force is applied to the laser hybrid welding head 1 again, it is returned to the original point or position by means of the contact-breaking device 18.

The elements making up the welding torch 5 are a torch body 19 and a mounting body 20, in which all the components needed for a standard torch are integrated. The welding torch 5 may be a MIG/MAG welding torch for running a MIG/MAG welding process, in other words an arc welding process 6, it merely being necessary to modify the individual elements of the welding torch 5, compared with the current state of the art, in a manner that will allow the mounting body 20 to be readily secured to and adjusted on the section 11 and set up a reliable wire feed to the arc welding process 6 and establish a very good contact for a delivered welding wire 21 with energy, in particular current and voltage.

Another contact-breaking device 22 is provided between the torch body 19 and the fixing body 20, enabling a corresponding displacement of the torch body 19 relative to the fixing body 20 when a corresponding force is exerted on it, as described above. This contact-breaking device 22 is designed so that an essentially light force applied to the torch body 19 will suffice to trigger a corresponding displacement, in the same way as necessary to operate the contact-breaking device 18 for the entire laser hybrid welding head 1.

The contact-breaking devices 18, 22 have a sensor—not illustrated—which generates a signal accordingly when the contact-breaking devices 18, 22 are activated. To this end, the contact-breaking devices 18, 22, in particular the sensors, are connected to a control system for the robot and/or to a welding apparatus—not illustrated—so that the control system can detect whenever one or both of these sensors is activated. As a result, continued displacement of the robot arm 3, in other words the laser hybrid welding head 1, or the welding process can be halted when a corresponding force is applied, thereby preventing damage to the individual components.

In the laser hybrid welding head 1 proposed by the invention, the cross jet guide device 7 is attached to an end face 23 of the section 11, so that, in the embodiment illustrated as an example here—shown in FIG. 1—the compressed air delivered via the passages 14 and 15 and the compressed air fed away via the passage 13, is transferred directly to and from the cross jet guide device 7. To this end, appropriate passages 24 to 26 are provided in the interior of the cross jet guide device 7, running out of a housing of the cross jet guide device 7. These passages 24 to 26 are disposed at one end of the housing 27 so that any lines required, in particular the passages 13 to 15 or the incoming line 9 and the outgoing line 10, have to be disposed in a region at this end only.

Figure 3:
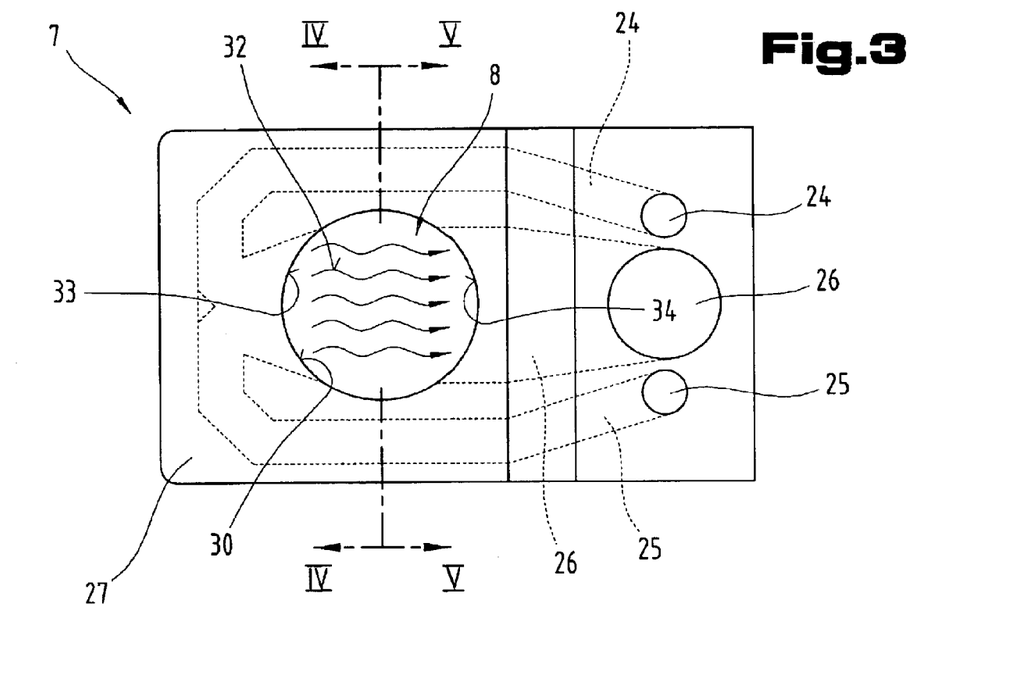
FIG. 3 is a simplified, schematic diagram showing a plan view of a cross jet guide device for the laser hybrid welding head.
Figure 4:
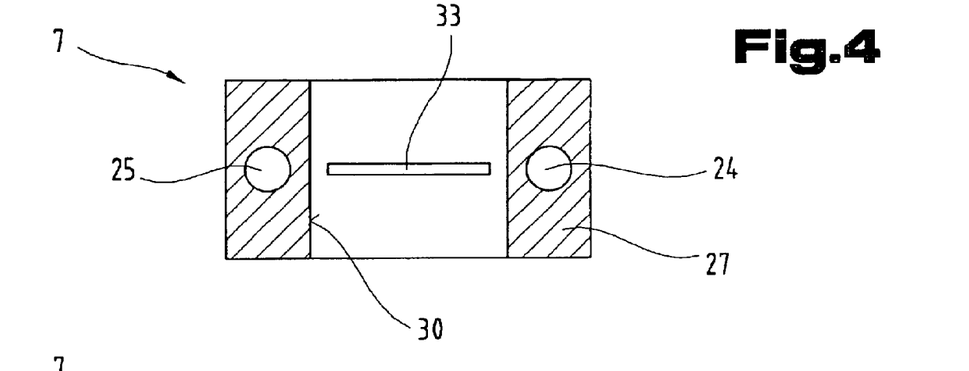
FIG. 4 is a simplified, schematic diagram showing a section through the cross jet guide device along line IV—IV indicated in FIG. 3.
Figures 5, 6:
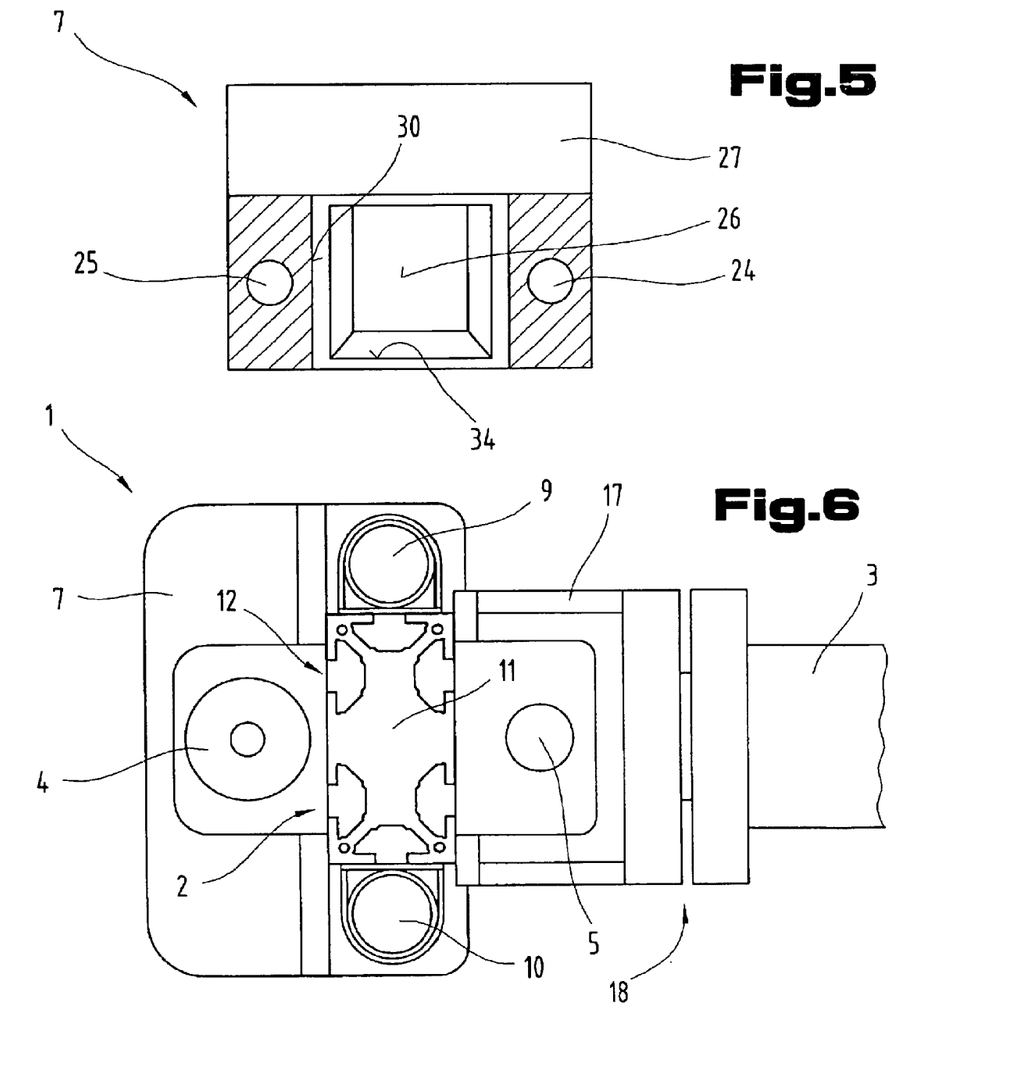
FIG. 5 is a simplified, schematic diagram showing another section through the cross jet guide device along line V—V indicated in FIG. 3.
FIG. 6 is a simplified, schematic diagram showing a plan view of another embodiment of the laser hybrid welding head.

In the embodiment illustrated as an example here, and more specifically shown in FIGS. 3 to 5, the cross jet guide device 7 is preferably L-shaped, so that the cross jet guide device 7 is preferably disposed or extends at a defined distance 28 underneath the laser 4 and the laser optical system or the optical focussing unit or a protective pane 29 with a matching protective monitoring window for the laser 4. The housing 27 of the cross jet guide device 7 also has an orifice 30 or a recess, in which the cross jet 8 is generated, i.e. the cross jet guide device 7 has an orifice 30 through which a schematically indicated laser beam 31 is beamed from the laser 4, so that the compressed air flows through the orifice 30 at an angle of preferably 90° C. with respect to the laser beam 31 so that a cross jet flow 32 is generated in the orifice 30.

The cross jet guide device 7 used for this purpose is illustrated in detail in FIGS. 3 to 5, FIG. 3 showing a plan view onto the housing 27 and FIGS. 4 and 5 respectively showing an end-on view of the housing 27—along section lines IV—IV and V—V indicated in FIG. 3.

The cross jet guide device 7 may be made in the form of a single-piece or multi-part cast component or an injection-moulded part of aluminium or plastics, for example. Naturally, the housing 27 may be of any design structure known from the prior art, the only design requirement being that an orifice 30 must be provided and the orifice 30 must communicate with the passages 24 to 26 in the interior of the housing. Consequently, in the housing 27 of the cross jet guide device 7, the passages 24 to 26 are laid out as an extension of the passages 13 to 15 of the section 11, in other words as an extension of the incoming and outgoing lines 9, 10, the latter extending into the orifice 30 forming an outlet passage 33 and an oppositely lying inlet passage 34 to and from the orifice 30 at the end faces, i.e. the end-to-end orifice 30 is provided in the housing 27 of the cross jet guide device 7 for a laser beam 31 to extend through the orifice 30, whilst the outlet passage 33 and an oppositely lying inlet passage 34 are provided at the end faces of the orifice 30 for the compressed air, in particular for the cross jet 8 or the cross jet flow 32.

As a result, the compressed air is delivered and flows out of the outlet passage 33 into the orifice 30 and then flows into the inlet passage 34 disposed at the oppositely lying end, so that the compressed air forms or generates an air flow, in particular the cross jet flow 32, in the orifice 30. The guide aspects of the passages 24 and 26 as well as the shape of the inlet and outlet passages 33, 34 may be of any design and are not restricted to that in the embodiment illustrated as an example here. It is merely necessary to ensure that a cross-flow or what is referred to as a cross jet 8 is created in the orifice 30 of the cross jet guide device 7.

The housing 27 is advantageously designed to generate an incoming and outgoing airflow at an end or side face. However, it would also be possible for the intake and discharge of compressed air to be operated at different, in particular oppositely lying, end or side faces of the housing 27.

Another option is to provide the housing 27 in a cuboid shape or an L-shaped design, in which case the orifice 30 will extend through the housing 27 and will be oriented in a substantially perpendicular arrangement on two oppositely lying side faces. The housing 27 may also be provided with an additional passage for discharging at least a part-flow of the compressed air. Discharging the compressed air in at least two part-flows makes it easier to carry away particles of dirt or welding debris.

The purpose of the cross jet guide device 7, in particular the resultant cross jet 8, is to shield the optical system of the laser 4 and the laser optics or optical focussing unit or the schematically indicated protective pane 29 disposed in front of these components, from welding splatter generated during a welding process. Accordingly, the cross jet 8 is disposed underneath the laser 4 and the laser optics or the optical focussing unit, in other words between the laser 4 and the region where the welding process is being operated by the laser 4 and the welding torch 5. The cross jet guide device 7, in particular the cross jet 8, is set up so that the resultant cross jet flow 32, in particular an air flow, is generated ion the manner schematically indicated by the arrows in FIG. 3. The cross jet 8, in particular the cross jet flow 32, is preferably generated at a flow speed of between 100 and 600 m/s and/or the cross jet pressure is between 2.5 and 6 bar. The cross jet 8 is therefore able to generate a supersonic flow, what is known as a Laval nozzle being formed in the cross jet guide device 7.

To enable the cross jet flow 32, in particular the compressed air, to be fed away from the region of the laser hybrid welding head 1, in particular away from the area of the arc welding process 6, an appropriate passage 26 is provided in the cross jet guide device 7 for discharging the cross jet flow 32, i.e. the cross jet flow 32 generated via the passages 24, 25 of the cross jet guide device 7 flows through the orifice 30 of the cross jet guide device 7 into passage 26 and from there into passage 13, in particular the outgoing line 10, in the section 11, so that welding debris picked up by the cross jet flow 32, especially materials flung towards the laser 4 and the laser optics or the optical focussing unit, are carried via the outgoing line 10 away from the region of the laser hybrid welding head 1. The outgoing line 10 is connected to a suction system, for example, so that an appropriate vacuum pressure can be generated in the outgoing line 10, thereby enabling the cross jet flow 32 to be sucked out through the orifice 30 of the cross jet guide device 7. To enable the cross jet flow 32 to be fed away through the inlet passage more efficiently, the inlet passage 34 is bigger in volume than the outlet passage 33.

The essential feature of a laser hybrid welding head 1 of this type is that the cross jet 8 is generated at a specific distance from the arc welding process 6 because if a gas atmosphere—not illustrated—is being used as a shield and the cross jet guide device 7 were at too short a distance from it, the protective gas atmosphere would be drawn in the direction of the cross jet 8 by a vacuum pressure occurring around the cross jet 8. This would mean that the arc welding process 6 could no longer continue to be shielded by the requisite gas atmosphere.

By setting up the cross jet 8 in this manner, an almost closed system is created inside the housing 27 of the cross jet guide device 7, so that absolutely no or only slight air flows can be produced outside of the orifice 30 of the cross jet guide device 7. This enables a very short distance to be left between the cross jet 8 or cross jet guide device 7 and the welding process, especially the arc welding process 6, so that the structural dimensions of the laser hybrid welding head 1 can be significantly reduced, resulting in a considerable improvement in the handling of the laser hybrid welding head 1. It goes without saying that a cross jet guide device 7 of this type could also be used in other applications, such as a pure laser welding process, to protect the laser 4 and the laser optics or the optical focussing unit from smoke or loose metal debris. The major advantage resides in the fact that the cross jet flow 32 occurs inside the orifice 30 only and no or only light air flows are created outside of this orifice 30.

The special design of the cross jet guide device 7 also means that the laser 4 is exposed to attach at a restricted surface only because it is shielded from loose metal debris or welding splatter or smoke by the cross jet guide device 7, in particular by the housing 27 itself, and it is only in the region of the orifice 30 through which the laser beam 31 is directed that these particles are able to get in front of the laser 4 or the laser optical system or the optical focussing unit. The majority of particles are therefore already kept away by the housing 27 and the remaining particles are carried into the orifice 30 by the cross jet flow 32. Consequently, it is virtually impossible for welding splatter to penetrate as far as the laser 4. The significant factor here is that because this area is limited to the orifice 30, the nature and means of producing the cross jet 8 is made easy because it no longer needs to operate across a large surface area, which is the case with the open systems known from the prior art. To this end, the cross jet guide device 7 or housing 27 may be designed so that it at least partially encloses the co-operating the laser 4 and laser optical system or the optical focussing unit and the distance 28 from the housing to the laser 4 is screened off by designing the housing 27 accordingly so that lateral penetration of dirt or other foreign bodies to the parts to be protected, such as the laser 4 and laser optics or the optical focussing unit, can be prevented and ingress is only possible via the orifice 30. This being the case, it is possible to generate a vacuum pressure in this region, in other words between the laser 4 and the cross jet guide device 7, and this vacuum pressure may be branched off from the incoming line 9. This can easily be arranged if at least one of the passages 24 or 25 has at least one bore in the direction of the laser 4, as a result of which a part of the compressed air delivered can escape in the direction of the laser 4, enabling an appropriate vacuum pressure to be generated in this region above the housing 27.

The laser hybrid welding head 1 proposed by the invention also has one or more display units 35—schematically indicated—by means of which the relative positions of the components can be displayed, i.e. starting from a predefined position or initial position, the components, in particular the laser 4 and the welding torch 5, can be displaced in the X-, Y- and Z-directions relative to one another and displays or readings for these motion sequences can be indicated on the display unit 35 so that a specific relative positioning of the two components can be repeated at any time as and when necessary. Consequently, the laser hybrid welding head 1 may be positioned in readiness for a broad range of different welding processes whilst providing an easy means of re-setting to the corresponding initial values.

For example, the individual components, in particular the laser 4 and the welding torch 5, can be linked to an electronic recording device or measuring device for mechanical motions known from the prior art—not illustrated—and the values generated by the recording device displayed on the display unit 35. To this end, the display unit 35 may be disposed directly on the laser hybrid welding head 1 or in a central control device, for example, in which case the values are transmitted to the display unit 35 or a control system via lines. This will mean that a setting of the laser hybrid welding head 1 can be reproduced at any time by electronic means. Naturally, it would also be possible to attach the individual components to an electronic displacement system as to automate the displacement, in which case only the value representing the shift will need to be set, enabling the corresponding motion control system to take over the displacement control.

For the sake of completeness, it should also be pointed out that the individual components are connected to the requisite supply systems by lines, as schematically indicated. To this end, the laser 4 is connected via a supply line 36 to an appropriate power source. The welding torch 5 is also connected via a hose pack 37 to a welding apparatus. Another possibility would be to link the power source for the laser 4 directly to the welding apparatus so that the power needed for the laser 4 and the welding torch 5 is supplied from the welding apparatus.

As a result of the special design of the laser hybrid welding head 1, no lines will be disposed in the region of the welding process at all, because they are all connected to the components at the end lying opposite. This will avoid situations where the laser hybrid welding head 1 is left hanging on a line or an object because there are no protruding lines around the components. This also means that the laser hybrid welding head 1 may be used in mirror image without changing the robot, in particular the programmed motion, since there is no need to make allowance for any lines or parts which might pose an obstacle, and the laser hybrid welding head 1 can even be used at points which are a difficult to access, as a result of its special design.

In another embodiment illustrated as an example—FIG. 6—the laser hybrid welding head 1 is depicted in a plan view, the section 11 again being disposed at the centre. The individual components are attached to this section 11 in the manner described above.

As mentioned above, the incoming line 9 and the outgoing line are no longer integrated in the mounting element 2 and in the section 11 but extend parallel with and attached to the section 11, which is arranged so that it extends between the two components, in particular the laser 4 and the welding torch 5. In this embodiment, the section 11 also has no internally lying passages 13 to 15.

This arrangement also enables the laser hybrid welding head 1 to be set up in a symmetrical structure without any protruding lines. Since standard, commercially available mounting systems may be used to mount the individual components, a specific description of the structure can be dispensed with as it is more or less as described with reference to the embodiments illustrated in FIGS. 1 to 5.

It should merely be pointed out that in the embodiments illustrated as examples in FIGS. 1 to 6, the components, in particular the laser 4 and the laser optics or the optical focussing unit and the welding torch 5, are mounted at both ends of the mounting element 2, in particular the section 11, whereas laser hybrid welding heads known from the prior art are constructed so that the laser and the welding torch are disposed on one side of the mounting plate, whilst the oppositely lying side is used for the connection to the robot, in particular the robot arm. This layout makes the laser hybrid welding head 1 excessively wide and all the more difficult to manipulate.

Figure 7:
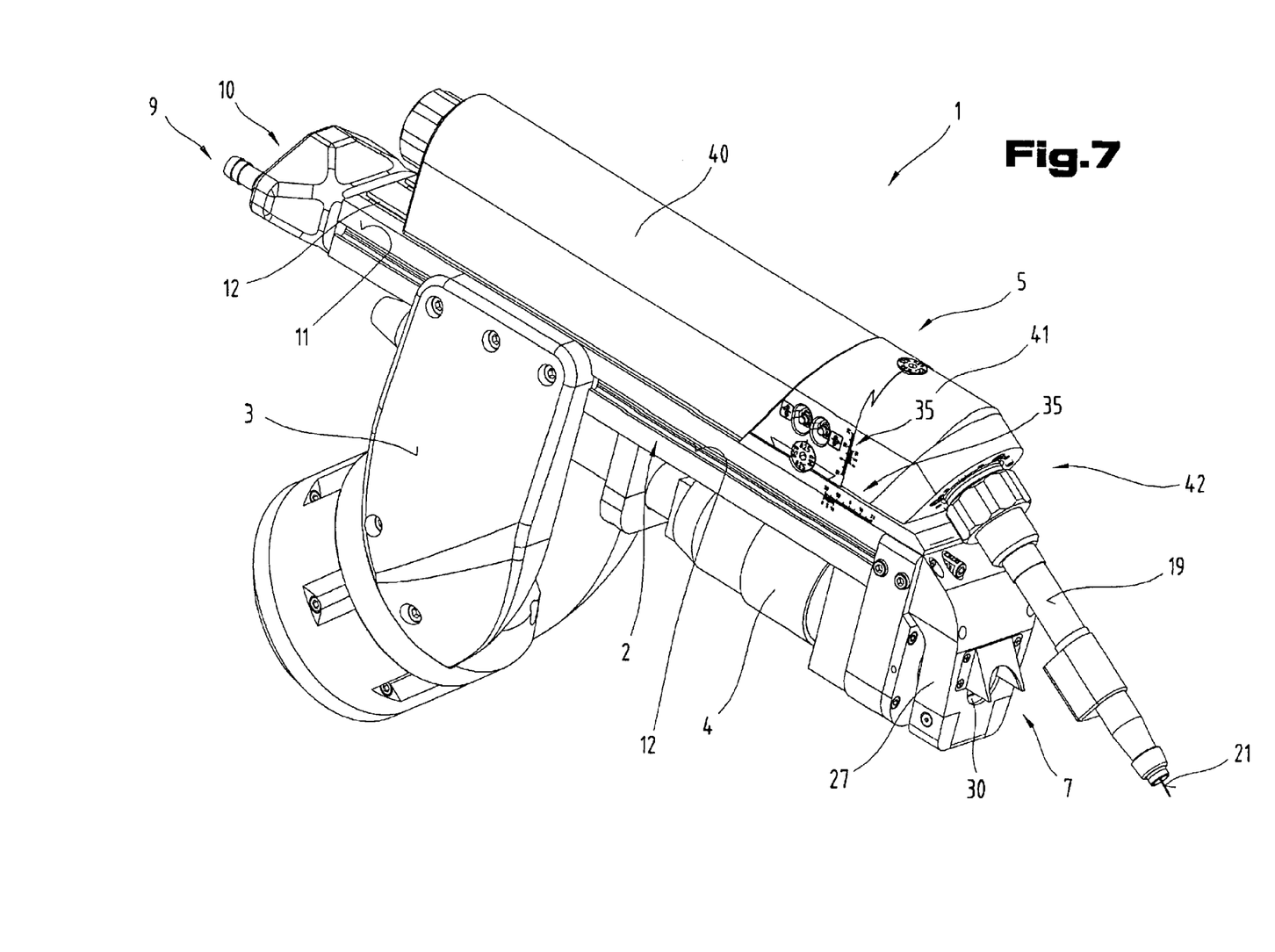
FIG. 7 is a simplified, schematic diagram depicting one example of an embodiment of the structure of the laser hybrid welding head.
Figure 8:
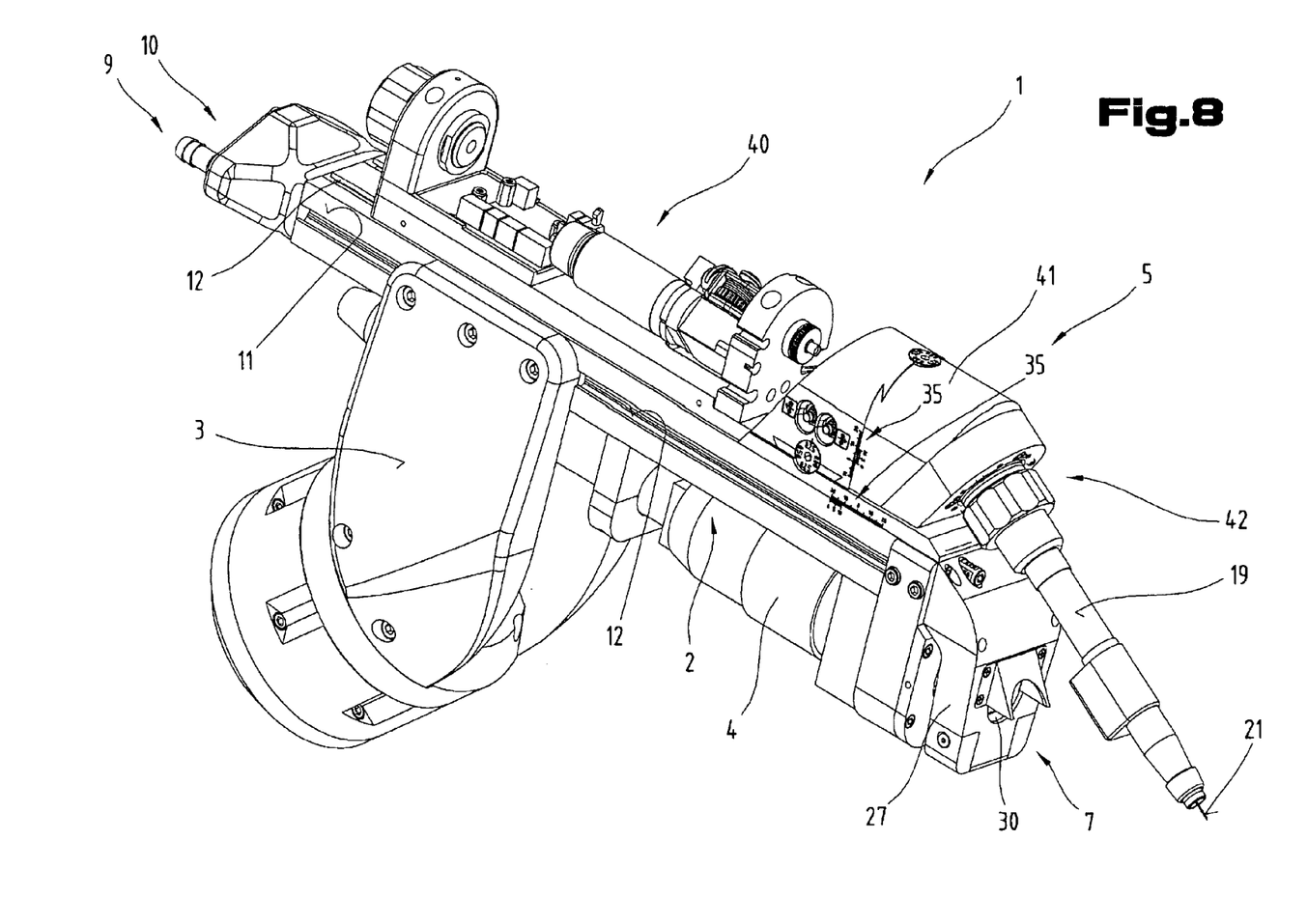
FIG. 8 shows the example of the embodiment of the laser hybrid welding head illustrated in FIG. 7, with the cover plate removed.
Figure 9:
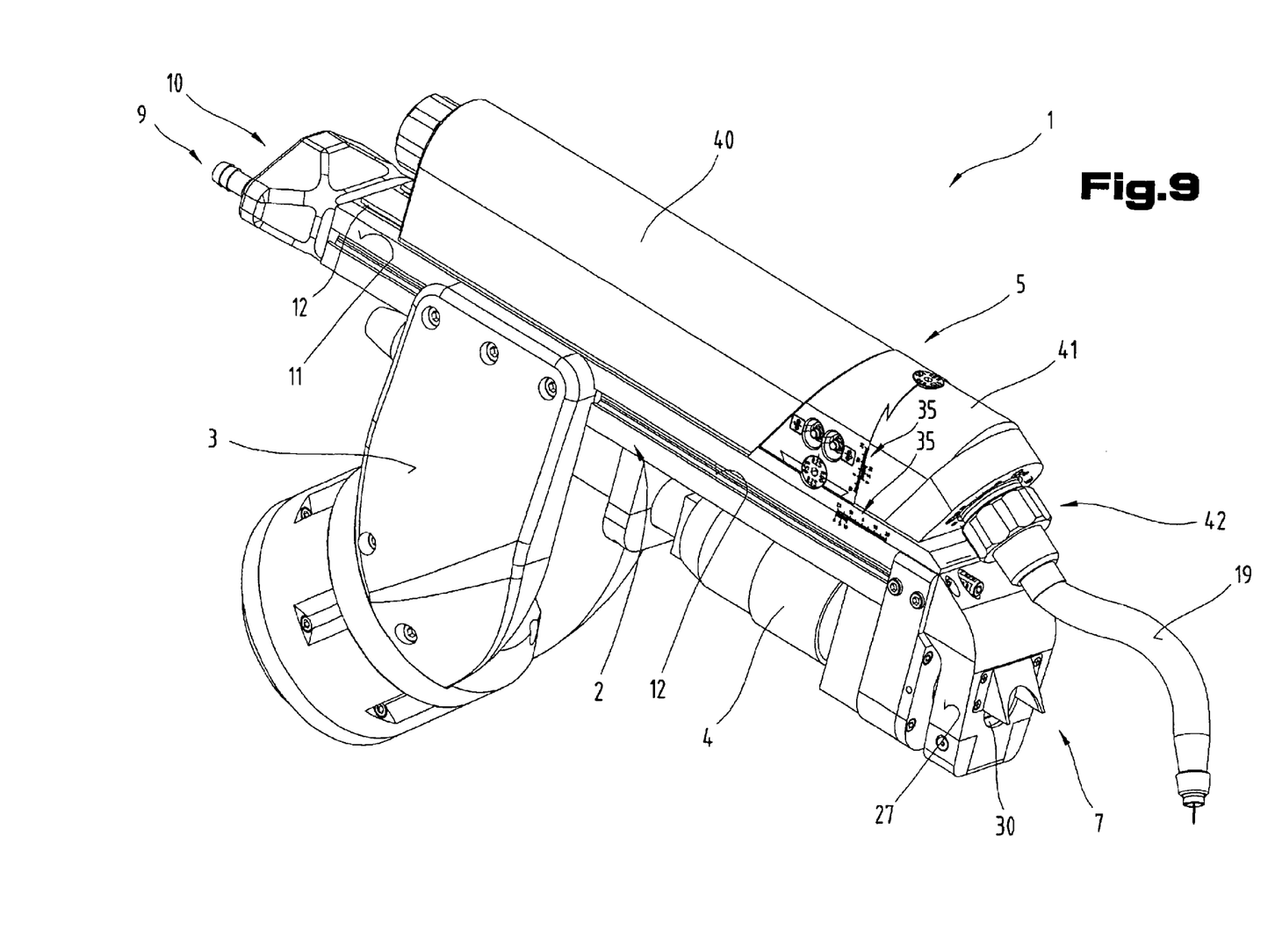
FIG. 9 depicts an example of another embodiment of the laser hybrid welding head for a laser soldering process.

FIGS. 7 to 9 illustrate another example, this time an embodiment of a modular laser hybrid welder or modular laser hybrid welding head 1, consisting of at least one mounting element 2, in particular the section 11, on which components such as a laser 4 and the laser optics or the optical focussing unit and elements of a torch or a welding torch 5 for a welding process are mounted. The modular laser hybrid welder additionally has a device for forming a cross jet 8 (not illustrated), in particular a cross jet guide device 7, which is connected via at least one incoming line 9 and an outgoing line 10 to a compressed air supply system.

The torch or welding torch 5 is made up of several individual modules, at least one of which modules, in particular the torch body 19, can be changed in order to run a range of different joining process, in particular a welding process or a soldering process. Accordingly, the torch body 19 can be changed in order to set up a MIG/MAG welding process, a TIG/WIG welding process, a double-wire welding process, a plasma welding process or for laser cold-wire soldering, laser hot-wire soldering or laser welding without an arc, i.e. different torch bodies 19 used for different joining processes can be connected to a module of the welding torch 5 so that one and the same laser hybrid welding head 1 can be used to run different processes without having to change the entire welding torch 5, in particular the modules.

As a result, the laser hybrid welder can advantageously be very rapidly modified to run a whole range of different welding processes. One particular advantage resides in the fact that, because of the modular design, the task of changing the torch body 19 can be automated and this changeover can be operated in the manner used as standard in robot technology on the basis of a tool changeover. This being the case, it has been found to be of particular advantage if any additional components or add-on modules, such as an external wire feed device or an additional welding torch 5 or torch body 19, not illustrated, are already attached to the section 11 or the latter is connected to the torch body 19, dispensing with the need for mechanical changes or settings.

The welding torch in this instance will consist of a drive module 40, a mounting module 41 and the torch body 19 and it will also be possible to connect additional modules, for example an external wire feed module. To enable the torch body 19 to be changed, the torch body 19 is connected to the mounting module 41 of the welding torch 5 by means of a connecting device 42, in particular a screw connection or plug and socket connection. The individual modules, in particular the drive module 40 and the mounting module 41, are attached to the section 11, whereas the torch body 19 is secured to the mounting module 41 of the welding torch. Consequently, when the torch body 19 is replaced, the positions of the modules attached to the section 11 remain unchanged so that the settings relating to the laser 4, in particular the laser beam, also remain unchanged. As a result, other torch bodies 19 can be made to a matching design in terms of their length, thereby enabling an optimum welding process. It is preferable if individual torch bodies 19 are always made to the same standard length and as a precision component. However, the torch bodies 19 may be of different shapes, as is the case in FIG. 9, for example. In this embodiment, the torch body 19 is specially designed for a soldering process and the welding material, in particular the welding wire 21, is fed at a different angle than is the case for a welding process.

In another alternative, the add-on modules may also be attached to the section 11. The section may be pre-mounted with appropriate fixing means for this purpose, which again will enable mounting and dismantling processes to be automated. As a result of the combined design of the welding torch 5 for both soldering and welding, it will then be possible to generate an inert gas atmosphere during a soldering process because all the delivery lines needed for this purpose will be to hand.

For the sake of good order, it should finally be pointed out that, in order to provide a clearer understanding of the laser hybrid welding head 1, it and its constituent parts are illustrated to a certain extent out of proportion and/or on an enlarged scale and/or on a reduced scale.

The independent solutions proposed by the invention and the underlying objective may be found in the description.

Above all, the individual features of the embodiments illustrated in FIGS. 1, 2, 3, 4, 5; 6 may be construed as independent solutions proposed by the invention in their own right. The related objectives and solutions proposed by the invention may be found in the detailed descriptions of the drawings.

| List of reference numbers | |
|---|---|
| 1 | Laser hybrid welding head |
| 2 | Mounting element |
| 3 | Robot arm |
| 4 | Laser |
| 5 | Welding torch |
| 6 | Arc welding process |
| 7 | Cross jet guide device |
| 8 | Cross jet |
| 9 | Incoming line |
| 10 | Outgoing line |
| 11 | Section |
| 12 | Fixing groove |
| 13 | Passage |

-continued

List of reference numbers

| | |
|---|---|
| 14 | Passage |
| 15 | Passage |
| 16 | Manipulator |
| 17 | Fixing device |
| 18 | Contact-breaking device |
| 19 | Torch body |
| 20 | Fixing body |
| 21 | Welding wire |
| 22 | Contact-breaking device |
| 23 | End face |
| 24 | Passage |
| 25 | Passage |
| 26 | Passage |
| 27 | Housing |
| 28 | Distance |
| 29 | Protective pane |
| 30 | Orifice |
| 31 | Laser beam |
| 32 | Cross jet flow |
| 33 | Outlet passage |
| 34 | Inlet passage |
| 35 | Display unit |
| 36 | Supply line |
| 37 | Hose pack |
| 38 | |
| 39 | |
| 40 | Drive module |
| 41 | Mounting module |
| 42 | Connecting module |

What is claimed is:

1. Apparatus, in particular a laser hybrid welding head, for a laser hybrid welding process, in which components such as a laser and laser optics or an optical focussing unit and elements of a welding torch for an arc welding process and/or a feed device for a welding wire, as well as a device for generating a cross jet connected by at least an incoming line and an outgoing line to a compressed air supply system, are mounted on at least one mounting element, the incoming line and the outgoing line carrying compressed air for the cross jet are disposed between two of the components, in particular the laser and the laser optics or the optical focussing unit and the elements of the welding torch or feed device for the welding wire.

2. Apparatus as claimed in claim 1, wherein the mounting element has a section with mounting grooves for the components of the laser hybrid welding head (1).

3. Apparatus as claimed in claim 1, wherein the mounting element has an end-to-end passage extending through the centre, which preferably constitutes the outgoing line, and two other passages disposed parallel with this passage, which preferably constitute incoming lines.

4. Apparatus as claimed in claim 1, wherein the mounting element is connected to a manipulator of a robot via a fixing device.

5. Apparatus as claimed in claim 4, wherein a contact-breaking device is provided between the manipulator of the robot and the mounting element, in particular for moving the laser hybrid welding head under the action of a force.

6. Apparatus as claimed in claim 1, wherein one of the components is a welding torch with elements consisting of a torch body and a fixing body.

7. Apparatus as claimed in claim 6, wherein a contact-breaking device is provided between the torch body and the fixing body, in particular for moving the torch body under the action of a force.

8. Apparatus as claimed in claim 1, wherein a cross jet guide device is attached to an end face of the mounting element.

9. Apparatus as claimed in claim 8, wherein the cross jet guide device is disposed at a distance underneath the laser and the laser optics or the optical focussing unit.

10. Apparatus as claimed in claim 8, wherein the cross jet guide device has an orifice through which a laser beam of the laser passes.

11. Apparatus as claimed in claim 8, wherein the cross jet guide device in which a cross jet is generated has a housing, which is designed to at least partially surround or shield the laser and the laser optics or the optical focussing unit.

12. Apparatus as claimed in claim 1, wherein the laser and the laser optics or the optical focussing unit are disposed at one side of the mounting element and the welding torch is disposed at another, preferably oppositely lying, side of the mounting element.

13. Apparatus as claimed in claim 1, wherein the welding torch is a MIG/MAG welding torch for running a MIG/MAG welding process.

14. Cross jet guide device with a housing for generating or creating a cross jet, in particular a cross jet flow, which is preferably connected by at least one incoming line and outgoing line to a compressed air supply system for delivering compressed air, and the housing has an end-to-end orifice for a laser beam extending through the orifice the cross jet guide device comprising an outlet passage and an oppositely lying inlet passage at end faces of the orifice for compressed air, in particular for the cross jet or the cross jet flow, the inlet passage having a bigger diameter and a bigger cross-sectional surface than the outlet passage, and the delivery of compressed air for the cross jet to and from the outlet passage and the inlet passage taking place on one side of the housing.

15. Cross jet guide device as claimed in claim 14, wherein the outlet passage is flow-connected with passages of the outgoing line and the inlet passage is flow-connected with a passage of the incoming line.

16. Cross let guide device as claimed in claim 14, wherein the outlet passage is designed for admitting compressed air to the orifice and the inlet passage for carrying compressed air out of the orifice.

17. Cross jet guide device as claimed in claim 14, wherein the housing is designed to generate an air flow, in particular the cross jet or the cross jet flow in the orifice.

18. Cross jet guide device as claimed in claim 14, wherein the housing is designed so that compressed air is preferably admitted and discharged from one end or side face of the housing.

19. Cross jet guide device as claimed in claim 14, wherein the housing has another passage for carrying out at least a part-flow of the compressed air.

20. Cross jet guide device as claimed in claim 14, wherein the housing is of an L-shaped design and the orifice extends through the housing and is oriented substantially perpendicular to two oppositely lying end faces.

21. Modular laser hybrid welding head, in which at least one mounting element is mounted with a laser and laser optics or an optical focussing unit and elements of a welding torch for a joining process, the latter being connected to a device for generating a cross jet connected by at least an incoming line and an outgoing line to a compressed air supply system, wherein the welding torch is made up of several individual modules, whereby at least one module, can be changed to run a range of different joining processes.

22. Modular laser hybrid welding head as claimed in claim 21, wherein the welding torch is designed for setting up a MIG/MAG welding process, a TIG/WIG welding process, a double-wire welding process, a plasma welding process, or for laser cold-wire soldering, laser hot-wire soldering or laser welding without an arc.

23. Modular laser hybrid welding head as claimed in claim 21, wherein the welding torch is designed so that a shielding gas atmosphere is created during soldering.

24. Modular laser hybrid welding head as claimed in claim 21, wherein at least one of the modules is a torch body of the welding torch.

25. Modular laser hybrid torch as claimed in claim 24, wherein the torch body is connected by a connecting module, in particular by a screw connection or a plug and socket connection, to a mounting module of the welding torch.

26. Modular laser hybrid torch as claimed in claim 21, wherein the welding torch consists of a drive module, a mounting module and a torch body, to which other add-on modules such as an external wire feed module can be connected.

27. Modular laser hybrid torch as claimed in claim 26, wherein the individual modules, in particular the drive module and the mounting module are attached to a section, whereas the torch body is attached to the mounting module.

28. Modular laser hybrid torch as claimed in claim 27, wherein the add-on modules are also attached to the section.

29. Modular laser hybrid welding head as claimed in claim 21, wherein at least one of the modules can be changed to run a welding process or a soldering process.

* * * * *